United States Patent [19]

McIntyre et al.

[11] Patent Number: 4,824,508
[45] Date of Patent: Apr. 25, 1989

[54] METHOD FOR MAKING AN IMPROVED SOLID POLYMER ELECTROLYTE ELECTRODE USING A LIQUID OR SOLVENT

[75] Inventors: John M. McIntyre; Bruce R. Smith; Jeffrey D. Birdwell, all of Lake Jackson, Tex.

[73] Assignee: The Dow Chemical Company, Midland, Mich.

[21] Appl. No.: 806,714

[22] Filed: Dec. 9, 1985

[51] Int. Cl.⁴ .................. B32B 31/12; C25B 11/20
[52] U.S. Cl. .................. 156/276; 156/298; 156/306.3; 204/283; 204/296; 429/27
[58] Field of Search .......... 204/98, 128, 283, 296; 264/105; 429/27, 208, 212; 156/276, 298, 306.3

[56] References Cited

U.S. PATENT DOCUMENTS

| | | | |
|---|---|---|---|
| 3,134,697 | 5/1964 | Niedrach | 136/86 |
| 4,107,005 | 8/1978 | D'Agostino et al. | 204/98 |
| 4,191,618 | 3/1980 | Coker et al. | 204/283 |
| 4,210,501 | 7/1980 | Dempsey et al. | 204/283 |
| 4,224,121 | 9/1980 | Dempsey et al. | 204/98 |
| 4,272,353 | 6/1981 | Lawrance et al. | 204/283 |
| 4,299,674 | 11/1981 | Korach | 204/98 |
| 4,299,675 | 11/1981 | Korach | 204/98 |
| 4,315,805 | 2/1982 | Darlington et al. | 204/98 |
| 4,341,605 | 7/1982 | Solenberger et al. | 204/98 |
| 4,364,815 | 12/1982 | Darlington et al. | 204/283 |
| 4,389,297 | 6/1983 | Korach | 204/252 |
| 4,394,229 | 7/1983 | Korach | 204/98 |
| 4,421,579 | 12/1983 | Covitch et al. | 204/98 |
| 4,437,951 | 3/1984 | Bissot et al. | 204/98 |
| 4,468,311 | 8/1984 | de Nora et al. | 204/252 |
| 4,469,579 | 9/1984 | Covitch | 204/283 |
| 4,486,276 | 12/1984 | Cohn et al. | 204/98 |
| 4,545,886 | 10/1985 | de Nora et al. | 204/252 |
| 4,610,726 | 9/1986 | Birdwell | 204/98 |
| 4,610,762 | 9/1986 | Birdwell | 204/1 R |
| 4,650,551 | 3/1987 | Carl et al. | 204/59 R |
| 4,650,711 | 3/1987 | Carl et al. | 428/265 |
| 4,654,104 | 3/1987 | McIntyre et al. | 156/276 |
| 4,666,574 | 5/1987 | Oda et al. | 204/98 |

FOREIGN PATENT DOCUMENTS

| | | |
|---|---|---|
| 0031660 | 7/1981 | European Pat. Off. |
| 0066369 | 12/1982 | European Pat. Off. |
| 0081251 | 6/1983 | European Pat. Off. |
| 2069006 | 8/1981 | United Kingdom |
| 2117797A | 10/1983 | United Kingdom |

*Primary Examiner*—John F. Niebling
*Assistant Examiner*—Kathryn Gorgos

[57] ABSTRACT

The invention is a method for forming a solid polymer electrolyte structure comprising:

a. forming a suspension of catalytically active, electrically conductive particles and a liquid such as dibromotetrafluoroethane;

b. applying the suspension to at least one side of a fluorocarbon membrane sheet, while said sheet is in its thermoplastic form;

c. removing substantially all of the liquid, leaving the particles on the membrane sheet;

d. pressing at least a portion of the particles into the membrane sheet;

e. contacting the side of the so-treated membrane having the particles on the surface with an electrically conductive, hydraulically permeable matrix;

f. subjecting the membrane/matrix combination to a pressure sufficient to embed at least a portion of the matrix into the membrane.

19 Claims, 1 Drawing Sheet

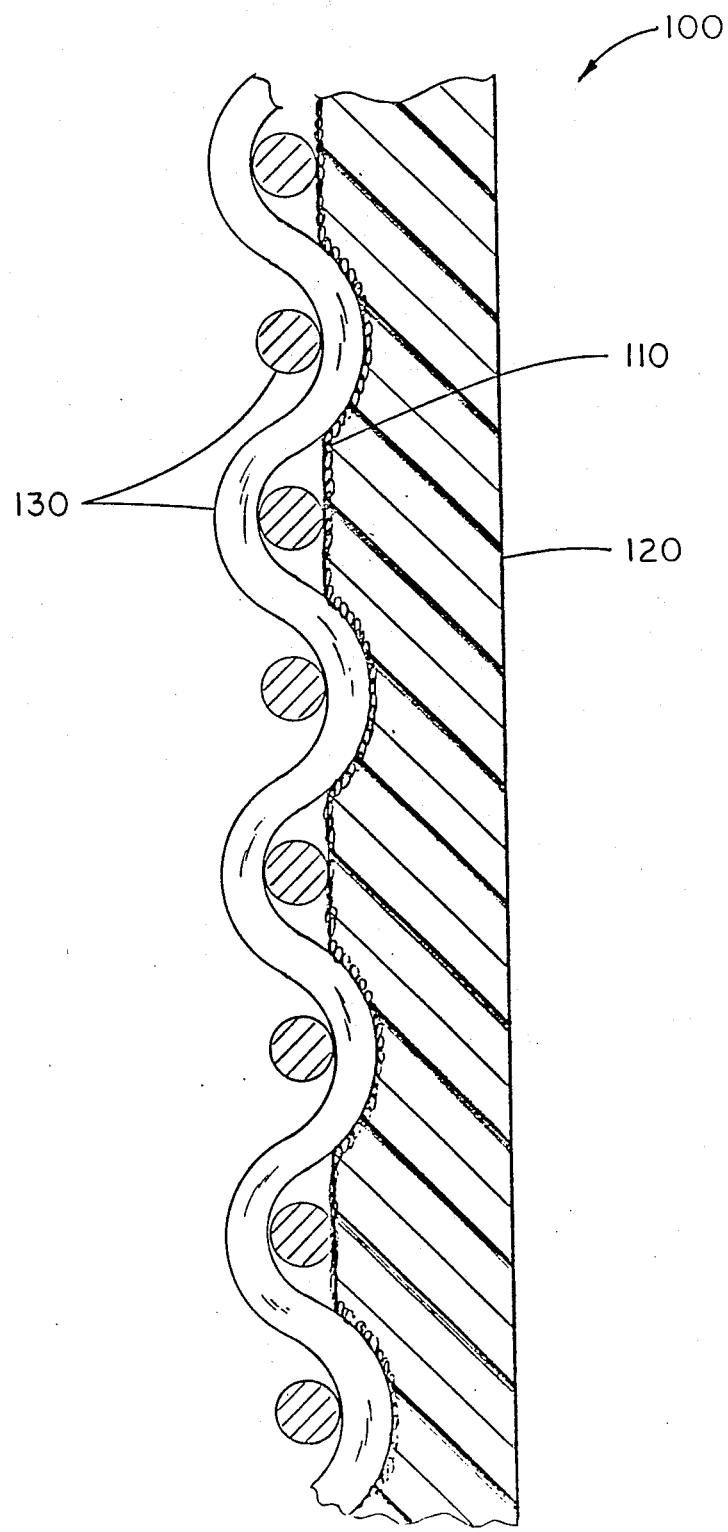

METHOD FOR MAKING AN IMPROVED SOLID POLYMER ELECTROLYTE ELECTRODE USING A LIQUID OR SOLVENT

BACKGROUND OF THE INVENTION

Solid polymer electrolyte (SPE) cells refer to cells in which one or both electrodes are bonded to or embedded in a polymeric ion exchange membrane. Such cells are rather well known in the art and are discussed in detail in the following U.S. Pat. Nos.: 4,315,805 "Solid Polymer Electrolyte Chlor-Alkali Process", Darlington, et al. (Feb. 16, 1982); 4,364,815 "Solid Polymer Electrolyte Chlor-Alkali Process and Electrolytic Cell", Darlington, et al. (Dec. 12, 1982); 4,272,353 "Method of Making Solid Polymer Electrolyte Catalytic Electrodes and Electrodes Made Thereby", Lawrence, et al. (June 9, 1981); and 4,394,229 "Cathode Element For Solid Polymer Electrolyte", Korach (July 19, 1983).

In SPE cells, a current collector is pressed against and contacts the electrode and provides a pathway for electrical current to flow from a power supply to the electrode. Current collectors are electrically conductive, hydraulically permeable matrices which may take a variety of shapes, sizes, and types, including metallic window screen, punched metallic plates, expanded metals, and the like. The following patents describe some commonly-used types of current collectors: U.S. Pat. Nos. 4,299,674 "Process For Electrolyzing An Alkali Metal Halide Using A Solid Polymer Electrolyte Cell", Korach (Nov. 10, 1981); 4,468,311 "Electrolysis Cell", de Nora, et al. (Aug. 28, 1984); and 4,215,183 "Wet Proofed Conductive Current Collectors for the Electrochemical Cells", MacLeod (July 29, 1980).

SPE cells often have major problems due to the high electrical resistance between the embedded or bonded electrodes and the current collectors which are pressed against the electrode. Many workers in the art have attempted to solve the high resistance problem in a variety of ways. Some solutions include the use of a mattress as shown in U.S. Pat. No. 4,468,311 "Electrolysis Cell", de Nora, et al. (Aug. 28, 1984); applying the electrocatalyst directly to a conductive carbon cloth which acts as the current collector as shown in U.S. Pat. No. 4,239,396 "This Carbon-Cloth-Based Electrocatalytic Gas Diffusion Electrodes, And Electrochemical Cells Comprising the Same", Allen, et al. (Oct. 6, 1981).

The present invention provides an SPE structure that minimizes the electrical resistance between the current collector and the embedded or bonded electrode.

SUMMARY OF THE INVENTION

The invention is a method for forming a solid polymer electrolyte structure comprising:
  a. forming a suspension of catalytically active, electrically conductive particles and a liquid such as dibromotetrafluoroethane;
  b. applying the suspension to at least one side of a fluorocarbon membrane sheet, while said sheet is in its thermoplastic form;
  c. removing substantially all of the liquid, leaving the particles on the membrane sheet;
  d. pressing at least a portion of the particles into the membrane sheet;
  e. contacting the side of the so-treated membrane having the particles on its surface with an electrically conductive, hydraulically permeable matrix;
  f. subjecting the membrane/matrix combination to a pressure sufficient to embed at least a portion of the matrix into the membrane.

BRIEF DESCRIPTION OF THE FIGURE

The FIGURE illustrates the SPE structure of the present invention and shows the membrane sheet 120, the plurality of electrically conductive particles 110, and the electrically conductive, hydraulically permeable matrix 130.

DETAILED DESCRIPTION OF THE INVENTION

As a result of the intimate contact between the membrane sheet, the electrically conductive particles, and the electrically conductive, hydraulically permeable matrix (which serves as a current collector and is connected to a power supply), the resistance to the flow of electrical energy is minimized and, thus, the cell operates more efficiently than cells employing the SPE structures of the prior art.

The SPE structure of the present invention includes embodiments where electrically conductive particles are bonded to or embedded in one, or both, sides of the membrane sheet.

The FIGURE shows the SPE structure 100. It is composed of a membrane sheet 120 which has a plurality of electrically conductive particles embedded into it. The particles are in physical and electrical contact with an electrically conductive, hydraulically permeable matrix 130, which is also embedded into the membrane sheet 120.

The membrane sheet divides the anode compartment from the cathode compartment and limits the type and amount of fluids and/or ions that pass between the anode compartment and the cathode compartments. The membrane may be a single layer membrane or a composite layer membrane.

The membrane may be constructed of a fluorocarbon-type material or of a hydrocarbon-type material. Such membrane materials are well known in the art. Preferably, however, fluorocarbon materials are generally preferred because of their chemical stability.

Non-ionic (thermoplastic) forms of perfluorinated polymers described in the following patents are suitable for use in the present invention: U.S. Pat. Nos. 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889; and 4,478,695; European Patent Application No. 0,027,009. Such polymers usually have equivalent weight in the range of from about 500 to about 2000.

To allow the cloth and the electrically conductive particles to be embedded into the fluorocarbon membrane, it is desirable for the fluorocarbon membrane to be in its thermoplastic form. It is in a thermoplastic form when it is made and before it is converted into an ion exchange form. By thermoplastic form, it is meant, for instance, that the membrane has $SO_2X$ pendant groups rather than ionically bonded $SO_3Na$ or $SO_3H$ pendant groups, where X is —F, —$CO_2$, —$CH_3$, or a quaternary amine.

Particularly preferred fluorocarbon materials for use in forming membranes are copolymers of monomer I with monomer II (as defined below). Optionally, a third type of monomer may be copolymerized with I and II.

The first type of monomer is represented by the general formula:

$$CF_2=CZZ' \tag{I}$$

where:
Z and Z' are independently selected from the group consisting of —H, —Cl, —F, or —CF$_3$.

The second monomer consists of one or more monomers selected from compounds represented by the general formula:

$$Y-(CF_2)_a-(CFR_f)_b-(CFR_{f'})_c-O-[CF(CF_2X)-CF_2-O]_n-(CF=CF_2 \tag{II}$$

where:
Y is selected from the group consisting of —SO$_2$Z, —CN, —COZ, and C(R$^3$f)(R$^4$f)OH;
Z is I, Br, Cl, F, OR, or NR$_1$R$_2$;
R is a branched or linear alkyl radical having from 1 to about 10 carbon atoms or an aryl radical;
R$^3$f and R$^4$f are independently selected from the group consisting of perfluoroalkyl radicals having from 1 to about 10 carbon atoms;
R$_1$ and R$_2$ are independently selected from the group consisting of H, a branched or linear alkyl radical having from 1 to about 10 carbon atoms or an aryl radical;
a is 0–6;
b is 0–6;
c is 0 or 1;
provided a+b+c is not equal to 0;
X is Cl, Br, F, or mixtures thereof when n>1;
n is 0 to 6; and
R$_f$ and R$_{f'}$ are independently selected from the group consisting of F, Cl, perfluoroalkyl radicals having from 1 to about 10 carbon atoms and fluorochloroalkyl radicals having from 1 to about 10 carbon atoms.

Particularly preferred is when Y is —SO$_2$F or —COOCH$_3$; n is 0 or 1; R$_f$ and R$_{f'}$ are F; X is Cl or F; and a+b+c is 2 or 3.

The third and optional monomer suitable is one or more monomers selected from the compounds represented by the general formula:

$$Y'-(CF_2)_{a'}-(CFR_f)_{b'}-(CFR_{f'})_{c'}-O-[CF(CF_2X)-CF_2-O]_{n'}-CF=CF_2 \tag{III}$$

where:
Y' is F, Cl or Br;
a' and b' are independently 0–3;
c is 0 or 1;
provided a'+b'+c' is not equal to 0;
n' is 0–6;
R$_f$ and R$_{f'}$ are independently selected from the group consisting of Br, Cl, F, perfluoroalkyl radicals having from about 1 to about 10 carbon atoms, and chloroperfluoroalkyl radicals having from 1 to about 10 carbon atoms; and
X' is F, Cl, Br, or mixtures thereof when n'>1.

Conversion of Y to ion exchange groups is well known in the art and consists of reaction with an alkaline solution.

While the fluorocarbon membrane is in its thermoplastic form, it is capable of softening when heated and hardening again when cooled. Thus, the cloth can be easily pressed into the fluorocarbon membrane when the fluorocarbon membrane has been heated. The temperature to which the fluorocarbon membrane is preferably heated to make it sufficiently soft to allow the cloth to be embedded therein depends, to a great extent, on the chemical formulation of the fluorocarbon membrane. In general, however, temperatures in the range of from about 150° Celsius to about 350° Celsius for fluorocarbon membranes having Y=—SO$_2$F (as defined in Equation II above), or 150° Celsius to 300° Celsius for fluorocarbon membranes having Y=—CO$_2$CH$_3$ (as defined in Equation II above). Hydrocarbon-based membranes may (depending upon the exact composition of the hydrocarbon material) be heated from about 100° Celsius to about 190° Celsius.

For example, a membrane sheet may be prepared by hot pressing a sulfonyl fluoride powder having an equivalent weight of about 1000, as described in U.S. Pat. No. 4,330,654 between two sheets of glass reinforced polytetrafluoroethylene at a temperature of about 310° Celsius under a pressure of about 0.75 tons per square inch for about 1.25 minutes. The resulting 6–7 inch diameter sheet is preferably in the range of from about 0.0001 to about 0.010 inches thick. More preferably, the thickness of the sheet is from about 0.0005 to about 0.015 inches thick. Most preferably, the thickness of the sheet is from about 0.002 to about 0.06 inches thick.

In the present invention, it is important to make an effective bond between the electrically conductive, hydraulically permeable matrix and the membrane. Such a bond may be made with or without the use of externally-applied pressure during bonding. It has been discovered, however, that better bonding is generally obtained when the membrane and the electrically conductive, hydraulically permeable matrix are first contacted and heated at zero pressure for about 1 minute, followed by pressing at about 1 to about 8 tons per square inch for from about 0.2 to about 2 minutes.

The present invention requires that at least one of the electrodes be in the form of a plurality of electrically conductive particles embedded into the membrane sheet. This is what makes a SPE electrode. The electrode composed of a plurality of electrically conductive particles can be either the cathode or the anode. Optionally, both electrodes can be electrically conductive particles embedded into opposite sides of the membrane sheet. For the purposes of the present discussion, the forms of both electrodes will be described as though they are electrically conductive particles and will also be described as if they are separate, conventional electrodes.

Conventional anodes are usually hydraulically permeable, electrically conductive structures made in a variety of shapes and styles including, for example, a sheet of expanded metal, perforated plate, punched plate, unflattened diamond shaped expanded metal, or woven metallic wire. Metals suitable for use as anodes include tantalum, tungsten, columbium, zirconium, molybdenum, and preferably, titanium and alloys containing major amounts of these metals.

Optionally the anodes may be a SPE electrode consisting of a plurality of electrically conductive particles embedded into the membrane sheet. Materials suitable for use as electrocatalytically active anode materials include, for example, activating substances such as oxides of platinum group metals like ruthenium, iridium, rhodium, platinum, palladium, either alone or in combination with an oxide of a film-forming metal. Other suitable activating oxides include cobalt oxide either alone or in combination with other metal oxides. Examples of such activating oxides are found in U.S. Pat. Nos. 3,632,498; 4,142,005; 4,061,549; and 4,214,971.

Conventional cathodes are usually hydraulically permeable, electrically conductive structures made in a variety of shapes and styles including, for example, a sheet of expanded metal, perforated plate, punched plate, unflattened diamond shaped expanded metal, or woven metallic wire. Metals suitable for use as cathode include, for example, copper, iron, nickel, lead, molybdenum, cobalt, alloys including major amounts of these metals, such as low carbon stainless steel, and metals or alloys coated with substances such as silver, gold, platinum, ruthenium, palladium, and rhodium.

Optionally, as has been stated, the cathode may be an SPE electrode consisting of a plurality of electrically conductive particles embedded into the membrane sheet. Materials suitable for use as electrocatalytically active cathode materials include, for example, platinum group metal or metal oxide, such as ruthenium or ruthenium oxide. U.S. Pat. No. 4,465,580 describes such cathodes.

The electrically conductive particles, whether used as an anode or as a cathode are preferably finely divided and have a high surface area. For example, in the case of an oxygen or hydrogen electrode fuel cell, platinum black (surface area greater than 25 $m^2$/gram) or high surface area (800–1800 $m^2$/g) platinum on activated carbon powder (average particle size 10–30 microns) are quite suitable for use as the anode and the cathode. In the case of a chlorine cell, an may be prepared in which ruthenium dioxide particles are prepared by thermal decomposition of ruthenium nitrate for 2 hours at 450° Celsius. The resulting oxide may then be ground using a mortar and pestle and the portion which passed through a 325 mesh sieve (less than 44 microns) used to prepare an electrode.

The electrically conductive, hydraulically permeable matrix which acts as a current collector to transmit electrical energy to or from the SPE electrode, may be composed of a variety of substances including carbon cloth, carbon paper, carbon felt, metallic screens, metallic felt, and porous metallic sheets. Preferably, however, the electrically conductive, hydraulically permeable matrix is a carbon cloth because carbon cloth is readily available, performs well, is easily handled, and is relatively inexpensive.

The cloth most preferably used in this invention is one having low electrical resistivity, relatively inexpensive, possess sufficient strength for fabrication, and have adequate surface properties, such as roughness, to provide good bonding between the ion exchange membrane and itself. It is also preferable to provide good electrical contact between the carbon cloth and the electrocatalytically active particles of the electrode.

The type of carbon cloth suitable for use in the present invention is commercially available from a variety of sources including: Stackpole Fibers Co. sold under the names Panex PWB-3, PWB-6, KFB and SWB-8; from Union Carbide Corp. sold under the names WCA Graphite Cloth and VCK and VCA carbon cloth. Carbon cloth may also be woven from carbon fibers available from Fiberite Corp. sold under the names Celion 1000, Celion 3000, Celion 6000, Celion 12000, or from Celanese Corporation sold as C-6, or G-50. These materials may vary in physical properties but are acceptable for use in the present invention if they are sufficiently strong to maintain their physical integrity during fabrication. Fiber size and weave patterns may also vary and are not critical to the successful operation of the present invention. Cloth useful in the present invention preferably has a thickness of from about 0.002 inches to about 0.025 inches and have electrical resistivities of from about 600,000 to about 1375 microohm-centimeters. More preferably the cloth used in the present invention has a resistivity of approximately 1500 microohm-centimeters.

The SPE structure may then be fabricated by preparing the membrane in the thermoplastic form, embedding the electrocatalytically active particles into the membrane, bonding the current collector over the particles, and then converting the membrane to its ionic form by reacting it with, in the case of $-SO_2F$ pendant groups, 25 weight % NaOH under the following conditions: 1. immerse the film in about 25 weight percent sodium hydroxide for about 16 hours at a temperature of about 90° Celsius; 2. rinse the film twice in deionized water heated to about 90° Celsius, using about 30 to about 60 minutes per rinse. The pendant group is then in the $-SO_3^-Na^+$ form. Cations other than $Na^+$ can be made to replace the $Na^+$ if practical (such as $H^+$).

The electrocatalytically active particles may be incorporated into the surface of the membrane using a variety of techniques including, making a suspension of the particles with a liquid and spraying or pouring the suspension over the membrane, removing the solvent, for example by allowing the liquid to evaporate, and then hot pressing the particles into the membrane with or without the carbon cloth in place. For example platinum and carbon particles may be slurried in dibromotetrafluoroethane and poured or sprayed onto a membrane. The dibromotetrafluoroethane is then allowed to evaporate. Carbon cloth current collectors can then be hot pressed onto these so-formed electrodes.

The quantity of particles used on the membrane film to form the SPE electrode may vary depending upon the activity of the electrocatalyst, its cost, etc. For chlor-alkali SPE membranes, the amount of catalyst used is usually from about 0.4 to about 1.0 milligrams catalyst/square centimeter of membrane. There is an upper limit on the amount of particles which may be placed onto the membrane because the particles penetrate the membrane. The upper limit has been determined to be about 25 milligrams catalyst/square centimeter of membrane.

The solid polymer electrolyte structure of the present invention is useful in a wide variety of electrochemical cells including, for example, fuel cells for the continuous production of electrical energy; electrolysis cells for the production of chemical products; and batteries for the intermittent production of electrical energy.

We claim:

1. A method for forming a solid polymer electrolyte structure consisting essentially of:
   a. forming a suspension of catalytically active, electrically conductive particles and a liquid;
   b. applying the suspension to at least one side of a fluorocarbon membrane sheet, while said sheet is in its thermoplastic form;
   c. removing substantially all of the liquid, leaving the particles on the membrane sheet;

d. pressing at least a portion of the particles into the membrane sheet;
e. contacting the side of the so-treated membrane having the particles on the surface with an electrically conductive, hydraulically permeable matrix;
f. subjecting the membrane/matrix combination to a pressure sufficient to bond at least a portion of the matrix to the membrane.

2. The method of claim 1 wherein the membrane is from about 0.0005 to about 0.015 inches thick.

3. The method of claim 1 wherein the particles are applied to both sides of the membrane.

4. The method of claim 1 wherein the matrix is selected from the group consisting of carbon cloth, carbon paper. carbon felt, metallic screen, metallic felt and a porous metallic sheet.

5. The method of claim 4 wherein the carbon cloth has a thickness of from about 0.002 to about 0.025 inches.

6. The method of claim 1 wherein the matrix is carbon paper.

7. The method of claim 1 wherein the matrix has a resistivity of from about 600,000 to about 1375 microohm-centimeters.

8. The method of claim 1 wherein the matrix has a resistivity of about 1500 microohm-centimeters.

9. The method of claim 1 wherein the catalytically active particles have an average particle size diameter of from about 10 to about 30 microns.

10. The method of claim 1 wherein the catalytically active particles have a surface area of from about 800 to about 1800 square meters per gram.

11. The method of claim 1 wherein the catalytically active particles are selected from the group consisting of platinum group metals, platinum group metal oxides, ruthenium, iridium, rhodium, platinum, palladium, either alone or in combination with an oxide of a film-forming metal, and cobalt oxide either alone or in combination with other metal oxides.

12. The method of claim 1 wherein the catalytically active particles are present on the membrane at a level of less than about 25 milligrams per square centimeter of membrane.

13. The method of claim 1 wherein the catalytically active particles are present on the membrane at a level of from about 0.4 to about 1.0 milligrams per square centimeter of membrane.

14. The method of claim 1 wherein the fluorocarbon polymer has an equivalent weight of from about 500 to about 2000.

15. The method of claim 1 wherein the plurality of electrically conductive particles constitute an anode.

16. The method of claim 1 wherein the plurality of electrically conductive particles constitute an cathode.

17. The method of claim 1 wherein a plurality of electrically conductive particles form an anode electrode on one side of the membrane sheet and a plurality of electrically conductive particles form a cathode electrode on the opposite side of the membrane.

18. The method of claim 17 wherein one electrode is composed of a plurality of electrically conductive particles and the other electrode is composed of a porous metal plate.

19. The method of claim 1 wherein the liquid is dibromotetrafluoroethane.

* * * * *